(12) United States Patent
Kinomura

(10) Patent No.: US 9,013,062 B2
(45) Date of Patent: Apr. 21, 2015

(54) VEHICLE, CONTROL METHOD FOR VEHICLE, AND POWER RECEPTION FACILITIES

(75) Inventor: Shigeki Kinomura, Suntou-gun (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/351,297

(22) PCT Filed: Nov. 24, 2011

(86) PCT No.: PCT/JP2011/077023
§ 371 (c)(1),
(2), (4) Date: Apr. 11, 2014

(87) PCT Pub. No.: WO2013/076835
PCT Pub. Date: May 30, 2013

(65) Prior Publication Data
US 2014/0232180 A1 Aug. 21, 2014

(51) Int. Cl.
*H02J 7/34* (2006.01)
*B60L 11/18* (2006.01)
*B60R 16/033* (2006.01)
*B60L 11/12* (2006.01)
*H02J 3/32* (2006.01)

(52) U.S. Cl.
CPC .................. *B60R 16/033* (2013.01); *H02J 7/34* (2013.01); *H02J 3/32* (2013.01); *B60L 11/12* (2013.01); *B60L 11/1838* (2013.01); *Y02T 10/7077* (2013.01); *Y02T 10/7088* (2013.01); *Y02T 10/7005* (2013.01); *Y02T 90/16* (2013.01); *Y02T 90/163* (2013.01); *Y02T 90/14* (2013.01); *Y02T 90/128* (2013.01); *Y04S 10/126* (2013.01); *Y02E 60/721* (2013.01); *B60L 11/1809* (2013.01)

(58) Field of Classification Search
CPC ... B60R 16/033; B60L 11/18; B60L 11/1809; H02J 7/34; H02J 1/10
USPC ............................................... 307/9.1, 44, 48
See application file for complete search history.

(56) References Cited

U.S. PATENT DOCUMENTS

| 5,966,000 | A | 10/1999 | Yang |
| 2008/0185197 | A1 | 8/2008 | Nakamura et al. |
| 2009/0192655 | A1 | 7/2009 | Ichikawa et al. |
| 2009/0315512 | A1 | 12/2009 | Ichikawa et al. |

FOREIGN PATENT DOCUMENTS

| CN | A-1159087 | 9/1997 |
| CN | A-101277840 | 10/2008 |
| CN | A-101549652 | 10/2009 |
| JP | A-2000-303874 | 10/2000 |
| JP | A-2001-8380 | 1/2001 |
| JP | A-2002-315193 | 10/2002 |
| JP | A-2007-236023 | 9/2007 |
| JP | A-2008-43040 | 2/2008 |
| JP | A-2008-54439 | 3/2008 |
| JP | A-2008-195089 | 8/2008 |

*Primary Examiner* — Hal Kaplan
(74) *Attorney, Agent, or Firm* — Oliff PLC

(57) ABSTRACT

A vehicle ECU executes a program including the steps of determining whether or not to permit discharge assistance, generating first assistance information, transmitting the first assistance information, carrying out discharge control when a result of determination as to whether or not to request discharge assistance and requested discharge electric power is received and when measures based on the result of determination can be taken, and giving notification about whether or not discharge assistance is carried out.

8 Claims, 5 Drawing Sheets

VEHICLE, CONTROL METHOD FOR VEHICLE, AND POWER RECEPTION FACILITIES

TECHNICAL FIELD

The present invention relates to a technique for supplying electric power in a power storage device mounted on a vehicle to power reception facilities outside the vehicle.

BACKGROUND ART

Japanese Patent Laying-Open No. 2001-8380 (PTL 1) discloses a power management system for supplying and receiving electric power between a house and a vehicle incorporating a battery.

CITATION LIST

Patent Literature

PTL 1: Japanese Patent Laying-Open No. 2001-8380

SUMMARY OF INVENTION

Technical Problem

In the power management system disclosed in the publication described above, however, when a request for electric power exceeding discharging capability of a battery is issued to the vehicle from the house outside the vehicle, such an electric power request cannot be met.

An object of the present invention is to provide a vehicle, a control method for vehicle, and power reception facilities for meeting an electric power request exceeding discharging capability of a car-mounted battery issued from the outside of the vehicle.

Solution to Problem

A vehicle according to one aspect of this invention includes a power storage device, an engine, a power generator for charging the power storage device with motive power from the engine, and a control device for controlling the power generator to supply to the outside of the vehicle, in addition to electric power output from the power storage device, electric power generated by the power generator as a result of operation of the engine when electric power in the power storage device is supplied to the outside of the vehicle and when a requested amount of electric power requested from the outside of the vehicle exceeds available supply electric power of the power storage device.

Preferably, when the requested amount exceeds the available supply electric power of the power storage device, the control device determines whether or not to suppress generation of the generated electric power based on at least any of an amount of emission of carbon dioxide and a position of the vehicle.

Further preferably, the control device suppresses generation of the generated electric power when the requested amount exceeds the available supply electric power of the power storage device and when the position of the vehicle is in a prescribed area.

Further preferably, the prescribed area is an area where refrainment of operation of the engine is required.

Further preferably, the control device suppresses generation of the generated electric power when the requested amount exceeds the available supply electric power of the power storage device and when the amount of emission of carbon dioxide relative to an amount of generated electric power in generation of the generated electric power is greater than a threshold value.

Further preferably, the vehicle further includes a notification unit for notifying a user of whether or not the generated electric power is generated.

A control method for vehicle according to another aspect of this invention is a control method for vehicle used for a vehicle including a power storage device, an engine, and a power generator for charging the power storage device with motive power from the engine. This control method for vehicle includes the steps of determining, when electric power in the power storage device is supplied to the outside of the vehicle, whether or not a requested amount of electric power requested from the outside of the vehicle exceeds available supply electric power of the power storage device, and supplying, when a requested amount of electric power requested from the outside of the vehicle exceeds available supply electric power of the power storage device, to the outside of the vehicle, in addition to electric power output from the power storage device, electric power generated by the power generator as a result of operation of the engine.

A power reception device according to yet another aspect of this invention is a power reception device for receiving electric power from a vehicle including a power storage device, an engine, and a power generator for charging the power storage device with motive power from the engine. The power reception device includes an electrical device operating upon receiving supply of electric power from a power supply and a control device for requesting to the vehicle, generation of electric power in the power generator as a result of operation of the engine when the vehicle is requested to set the power storage device as a supply source of electric power for the electrical device instead of or in addition to the power supply and when a requested amount of electric power requested to the vehicle exceeds available supply electric power of the power storage device.

Advantageous Effects of Invention

According to this invention, when a requested amount of electric power requested from the outside of the vehicle exceeds available supply electric power of the power storage device, electric power supplied to the outside of the vehicle can be brought closer to the requested amount by supplying to the outside of the vehicle, in addition to electric power output from the power storage device, generated electric power generated in the power generator as a result of operation of the engine. Therefore, a vehicle, a control method for vehicle, and power reception facilities for meeting an electric power request exceeding discharging capability of a car-mounted battery from the outside of the vehicle can be provided.

DESCRIPTION OF EMBODIMENTS

Figure 1:
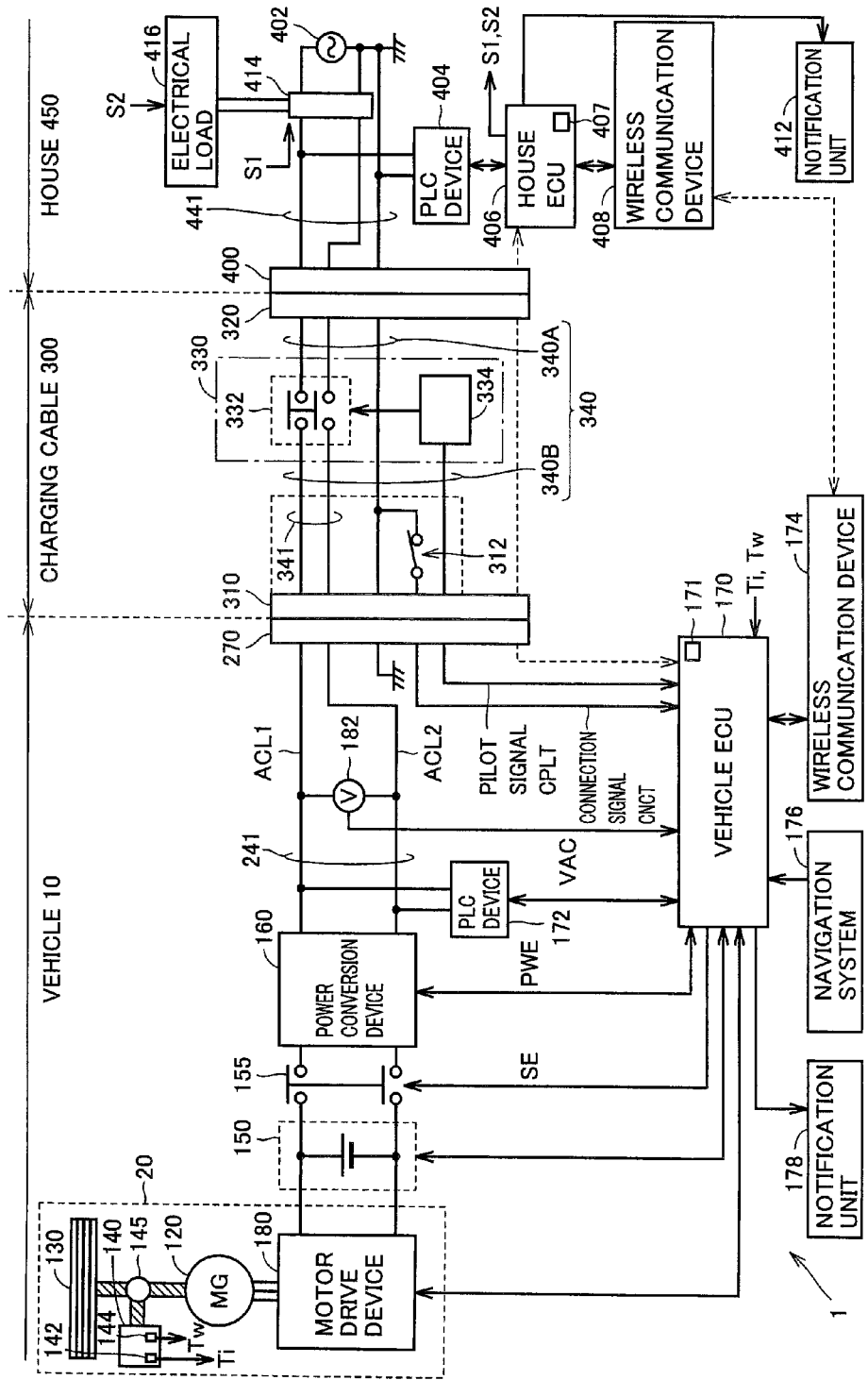
FIG. 1 is an overall block diagram of a charge and discharge system including a vehicle according to the present embodiment.

An embodiment of the present invention will be described hereinafter with reference to the drawings. In the description below, the same elements have the same reference characters allotted. Their label and function are also identical. Therefore, detailed description thereof will not be repeated.

As shown in FIG. 1, a charge and discharge system 1 in the present embodiment includes a vehicle 10 and a house 450. Vehicle 10 and house 450 are connected to each other through a charging cable 300.

Vehicle 10 according to the present embodiment is a hybrid vehicle including an inlet 270, a power conversion device 160, a relay 155, a power storage device 150, a drive portion 20, a vehicle ECU (Electronic Control Unit) 170, a first PLC (Power Line Communications) device 172, a wireless communication device 174, a navigation system 176, a notification portion 178, and a voltage sensor 182.

Though vehicle 10 according to the present embodiment will be described as a hybrid vehicle shown in FIG. 1, the vehicle is not particularly limited to a structure of the hybrid vehicle shown in FIG. 1 so long as a vehicle incorporates a power storage device for supplying electric power to car-mounted electrical appliances, a power generator for charging a power storage device with generated electric power, and an engine serving as a motive power source of the power generator.

Drive portion 20 includes a motor drive device 180, a motor generator (hereinafter also referred to as an "MG") 120, a drive wheel 130, an engine 140, and a power split device 145.

A connector 310 provided in charging cable 300 is connected to inlet 270.

Power conversion device 160 is connected to inlet 270 through power lines ACL1, ACL2. Power conversion device 160 is connected to power storage device 150 with relay 155 being interposed. Power conversion device 160 converts AC power supplied from a system power supply 402 in house 450 to DC power with which power storage device 150 can be charged, based on a control signal PWE from vehicle ECU 170 and supplies DC power to power storage device 150. Alternatively, power conversion device 160 converts DC power supplied from power storage device 150 to AC power adapted to home electrical appliances in house 450 based on control signal PWE from vehicle ECU 170 and supplies AC power to house 450.

Power storage device 150 is an electric power storage element configured such that it can be charged and can discharge. Power storage device 150 is configured to include a power storage element such as a secondary battery including a lithium ion battery, a nickel metal hydride battery, or a lead acid battery, or an electric double layer capacitor.

Power storage device 150 stores DC power supplied from power conversion device 160. Power storage device 150 is connected to motor drive device 180 for driving MG 120. Power storage device 150 supplies DC power used for generation of driving force for running a vehicle. Power storage device 150 stores electric power generated by MG 120.

Power storage device 150 further includes a voltage sensor for detecting a voltage of power storage device 150 and a current sensor for detecting a current input to and output from power storage device 150, neither of which is shown. The voltage sensor transmits a signal indicating a detected voltage to vehicle ECU 170. The current sensor transmits a signal indicating a detected current to vehicle ECU 170.

Motor drive device 180 is connected to power storage device 150 and MG 120. Motor drive device 180 converts electric power supplied from power storage device 150 to electric power for driving MG 120 under the control by vehicle ECU 170. Motor drive device 180 includes, for example, a three-phase inverter.

MG 120 is connected to motor drive device 180, and to drive wheel 130 with power split device 145 being interposed. MG 120 generates driving force for running vehicle 10, upon receiving electric power supplied from motor drive device 180. In addition, MG 120 generates regenerative braking force by generating AC power upon receiving rotational force from drive wheel 130. Vehicle ECU 170 controls regenerative braking force by transmitting a regenerative torque command value generated in accordance with a state of vehicle 10 to motor drive device 180. MG 120 is, for example, a three-phase AC motor generator including a rotor having a permanent magnet embedded and a stator having Y-connected three-phase coils.

MG 120 is connected also to engine 140 with power split device 145 being interposed. Vehicle ECU 170 controls vehicle 10 such that a ratio between driving force from engine 140 and driving force from MG 120 is optimal. MG 120 operates as a power generator as it is driven by engine 140. Electric power generated by MG 120 (hereinafter denoted as generated electric power) is stored in power storage device 150. In addition, generated electric power can be supplied to home electrical appliances and the like in house 450 via power conversion device 160 and inlet 270, instead of or in addition to electric power in power storage device 150.

Engine 140 is, for example, an internal combustion engine such as a gasoline engine or a diesel engine. An intake air temperature sensor 142 is provided in an intake passage of engine 140. Intake air temperature sensor 142 detects a temperature Ti of air in the intake passage (in the description below, denoted as an intake air temperature). Intake air temperature sensor 142 transmits a signal indicating detected intake air temperature Ti to vehicle ECU 170.

In addition, engine 140 is provided with a water temperature sensor 144. Water temperature sensor 144 detects a temperature Tw of a cooling medium which flows through the inside of engine 140 (in the description below, denoted as a cooling water temperature). Water temperature sensor 144 transmits a signal indicating detected cooling water temperature Tw to vehicle ECU 170.

Voltage sensor 182 is connected between power lines ACL1 and ACL2 and it detects a voltage VAC between power lines ACL1 and ACL2. Voltage sensor 182 transmits a signal indicating voltage VAC to vehicle ECU 170.

Relay 155 is interposed in a path connecting power conversion device 160 and power storage device 150 to each other. Relay 155 is controlled by a control signal SE from vehicle ECU 170 and switches between supply and cut-off of electric power between power conversion device 160 and power storage device 150. Though relay 155 is provided separately from power storage device 150 or power conversion device 160 in the present embodiment, it may be contained in power storage device 150 or power conversion device 160.

Vehicle ECU 170 includes a CPU (Central Processing Unit) (not shown in FIG. 1) and a memory 171 having a function as a storage device, an input/output buffer, or the like. Vehicle ECU 170 receives a signal from each sensor or the like and transmits a control command to each piece of equipment as well as controls vehicle 10 and each piece of equipment. It is noted that such control is not limited to processing by software, and can also be constructed by dedicated hardware (electronic circuitry) and processed.

Vehicle ECU 170 receives a connection signal CNCT and a pilot signal CPLT via inlet 270 through charging cable 300. Vehicle ECU 170 receives a detection value of voltage VAC from voltage sensor 182.

Vehicle ECU 170 receives a detection value for a current, a voltage, or a temperature from a sensor (not shown) provided in power storage device 150 and calculates SOC (State of Charge) indicating a remaining capacity of power storage device 150.

Vehicle ECU 170 controls power conversion device 160, relay 155, and the like for charging power storage device 150 or discharging to house 450, based on such information.

First PLC device 172 is connected to a power line 241. First PLC device 172 carries out power line communication with a second PLC device 404 connected to a power line 441 in house 450. For power line communication between first PLC device 172 and second PLC device 404, power lines 241, 341, 441 are made use of as communication paths. Power line communication between first PLC device 172 and second PLC device 404 is enabled as charging cable 300 is connected to both of vehicle 10 and house 450, that is, as a socket 400 and a plug 320 are connected to each other and connector 310 and inlet 270 are connected to each other.

First PLC device 172 includes, for example, a modem. When first PLC device 172 receives a high frequency signal from second PLC device 404 in house 450 through power line 241, it demodulates data from the received high frequency signal. First PLC device 172 transmits the demodulated data to vehicle ECU 170.

Alternatively, when first PLC device 172 receives data from vehicle ECU 170, it modulates the received data to a high frequency signal. First PLC device 172 outputs the modulated high frequency signal to power line 241.

It is noted that, when AC power of system power supply 402 has a frequency, for example, of 50 Hz or 60 Hz, a high frequency signal transmitted and received between first PLC device 172 and second PLC device 404 during power communication has a frequency, for example, from several MHz to several ten MHz.

Wireless communication device 174 carries out wireless communication with a wireless communication device outside vehicle 10. In the present embodiment, wireless communication device 174 carries out wireless communication with a wireless communication device 408 in house 450.

Though such specifications for wireless communication as Zigbee (trademark), Bluetooth (trademark), IEEE802.11, or infrared communication are used for wireless communication, wireless communication is not particularly limited to those specifications.

Navigation system 176 obtains a current position of vehicle 10. Navigation system 176 may obtain a current position of vehicle 10, for example, by making use of GPS (Global Positioning System). Alternatively, navigation system 176 may receive information on a current position of vehicle 10 from a base station around vehicle 10 (such as a base station for a portable telephone or a base station for wireless LAN (Local Area Network)) and obtain the current position of vehicle 10 based on the received information. Navigation system 176 transmits a signal indicating the obtained current position of vehicle 1 to vehicle ECU 170. The current position of vehicle 10 may be a position specified by an absolute position coordinate such as latitude and longitude or a position specified on a map stored in a memory.

The memory in navigation system 176 stores map information. Navigation system 176 notifies a driver of a current position of vehicle 1 or provides a passenger of vehicle 1 with a route to a destination by displaying a current position of vehicle 1 specified on the map with the use of a display or the like. The memory in navigation system 176 further stores information on a prescribed area where refrainment of operation of the engine is required (such as a nature reserve, an area where laws and regulations including an idling stop municipal law are applied, and an indoor garage not having a function to exhaust an exhaust gas; hereinafter also denoted as an engine operation refrainment area). For example, navigation system 176 may be connected to a communication network outside vehicle 10 through vehicle 10 alone or via house 450, so that it receives information on the engine operation refrainment area described above for storage in a memory or storage in a memory through user's registration.

Notification portion 178 notifies a user in vehicle 10 of prescribed information. In the present embodiment, notification portion 178 notifies the user of prescribed information, for example, by using a display implemented by an LCD (Liquid Crystal Display), an LED (Light Emitting Diode), or the like. It is noted that notification portion 178 may notify a user of prescribed information, for example, by using a sound generator generating sound or voice and sound.

Charging cable 300 includes connector 310 provided at an end portion on a vehicle side, plug 320 provided at an end portion on a system power supply side, a charging circuit interrupt device (hereinafter also referred to as a "CCID") 330, and an electric wire portion 340 for connection between pieces of equipments for input and output of electric power and a control signal. Charging cable 300 may be included on the vehicle 10 side or in house 450.

Electric wire portion 340 includes an electric wire portion 340A connecting plug 320 and CCID 330 to each other and an electric wire portion 340B connecting connector 310 and CCID 330 to each other. In addition, electric wire portion 340 includes power line 341 for transferring electric power from system power supply 402.

Plug 320 of charging cable 300 is connected to socket 400 of system power supply 402 in house 450 in the case of external charging or in the case where vehicle 10 is used as a power supply for house 450. In addition, connector 310 of charging cable 300 is connected to inlet 270 provided in a body of vehicle 10 in the case as described above. As plug 320 and socket 400 are connected to each other and connector 310 and inlet 270 are connected to each other, electric power from system power supply 402 is transferred to vehicle 10. Plug 320 can be attached to or detached from socket 400. Connector 310 can be attached to or detached from inlet 270.

In the inside of connector 310, a connection detection circuit 312 is provided. Connection detection circuit 312 detects a state of connection between inlet 270 and connector 310. Connection detection circuit 312 transmits connection signal CNCT indicating a state of connection to vehicle ECU 170 in vehicle 10 via inlet 270.

Connection detection circuit 312 may be implemented as a limit switch as shown in FIG. 1 so that a potential of connection signal CNCT is set to a ground potential (0 V) when connector 310 is connected to inlet 270. Alternatively, connection detection circuit 312 may be implemented as a resistor (not shown) having a prescribed resistance value so that a potential of connection signal CNCT is lowered to a prescribed potential at the time of connection. In any case, vehicle ECU 170 detects connection of connector 310 to inlet 270 by detecting a potential of connection signal CNCT.

CCID 330 includes a CCID relay 332 and a control pilot circuit 334. CCID relay 332 is interposed in power line 341 in charging cable 300. CCID relay 332 is controlled by control pilot circuit 334. When CCID relay 332 is opened, an electrical path of power line 341 is cut off. On the other hand, when CCID relay 332 is closed, electric power is supplied from house 450 to vehicle 10 or from vehicle 10 to house 450.

Control pilot circuit 334 outputs pilot signal CPLT to vehicle ECU 170 via connector 310 and inlet 270. This pilot signal CPLT is a signal for notifying vehicle ECU 170 of a rated current of charging cable 300 from control pilot circuit 334. In addition, pilot signal CPLT is used also as a signal for remote control of CCID relay 332 by vehicle ECU 170 based on a potential of pilot signal CPLT controlled by vehicle ECU 170. Then, control pilot circuit 334 controls CCID relay 332 based on change in potential of pilot signal CPLT.

Pilot signal CPLT and connection signal CNCT described above as well as such features as a shape of inlet 270 and connector 310 and terminal arrangement are standardized, for example, by SAE (Society of Automotive Engineers) in the United States, Japan Electric Vehicle Association, and the like.

House 450 includes socket 400, system power supply 402, second PLC device 404, a house ECU 406, wireless communication device 408, a notification portion 412, a switch portion 414, an electrical load 416, and power line 441.

Though system power supply 402 is described as an AC power supply in the present embodiment, it may be, for example, a DC power supply.

Second PLC device 404 is connected to power line 441. Second PLC device 404 carries out power line communication with first PLC device 172.

Second PLC device 404 includes, for example, a modem. When second PLC device 404 receives a high frequency signal from first PLC device 172 in vehicle 10 through power line 441, it demodulates data from the received high frequency signal. Second PLC device 404 transmits the demodulated data to house ECU 406.

Alternatively, when second PLC device 404 receives data from house ECU 406, it modulates the received data to a high frequency signal. Second PLC device 404 outputs the modulated high frequency signal to power line 441.

House ECU 406 includes a CPU (not shown) and a memory 407 having a function as a storage device, an input/output buffer, or the like. When communication with vehicle ECU 170 is enabled, house ECU 406 receives a signal from each sensor or the like provided in vehicle 10 and outputs a control command to each piece of equipment mounted on vehicle 10 via vehicle ECU 170 and controls each piece of equipment. It is noted that such control is not limited to processing by software, and can also be constructed by dedicated hardware (electronic circuitry) and processed.

Wireless communication device 408 carries out wireless communication with a wireless communication device outside or inside house 450. In the present embodiment, wireless communication device 408 carries out wireless communication with wireless communication device 174 in vehicle 10.

Communication between vehicle ECU 170 and house ECU 406 may be carried out when socket 400 and plug 320 are connected to each other and connector 310 and inlet 270 are connected to each other, or when vehicle 10 and house 450 are in a communication coverage area. In the present embodiment, when socket 400 and plug 320 are connected to each other and connector 310 and inlet 270 are connected to each other, vehicle ECU 170 and house ECU 406 cooperate with each other so that electric power is supplied from vehicle 10 to house 450 or from house 450 to vehicle 10.

Vehicle ECU 170 and house ECU 406 may communicate with each other through wireless communication using wireless communication device 174 and wireless communication device 408 when socket 400 and plug 320 are connected to each other and connector 310 and inlet 270 are connected to each other.

Alternatively, vehicle ECU 170 and house ECU 406 may communicate with each other through power line communication using first PLC device 172 and second PLC device 404 when socket 400 and plug 320 are connected to each other and connector 310 and inlet 270 are connected to each other.

Alternatively, vehicle ECU 170 and house ECU 406 may communicate with each other using both of wireless communication and power line communication described above when socket 400 and plug 320 are connected to each other and connector 310 and inlet 270 are connected to each other.

It is noted that a communication method is not particularly limited to the above-described method. For example, as shown with a dashed line in FIG. 1, a communication line connecting vehicle ECU 170 and house ECU 406 to each other via inlet 270, connector 310, plug 320, and socket 400 may be provided. Vehicle ECU 170 and house ECU 406 may communicate with each other through the communication line when socket 400 and plug 320 are connected to each other and connector 310 and inlet 270 are connected to each other.

Notification portion 412 notifies a user in house 450 of prescribed information. In the present embodiment, notification portion 412 notifies a user of prescribed information, for example, by using a display implemented by an LCD, an LED, or the like. It is noted that notification portion 178 may notify a user of prescribed information, for example, by using a sound generator generating sound or voice and sound.

Switch portion 414 switches from any one state of a first state in which electrical load 416 and system power supply 402 are connected in parallel to power line 441 and a second state in which system power supply 402 is disconnected, to the other state, based on a control signal S1 from house ECU 406.

In the first state, electric power from system power supply 402 is supplied to electrical load 416. In addition, electric power from system power supply 402 can be supplied also to vehicle 10 when socket 400 and plug 320 are connected to each other and connector 310 and inlet 270 are connected to each other.

On the other hand, in the second state, vehicle 10 serves as a power supply for electrical load 416. In this case, house 450 serves as power reception facilities using vehicle 10 as a supply source of electric power. Specifically, house ECU 406 controls the power conversion device such that DC power in power storage device 150 is converted to AC power via vehicle ECU 170 and controls CCID relay 332 such that resultant AC power is supplied to electrical load 416 through power lines 241, 341, 441.

Electrical load 416 is an electrical appliance provided in house 450 or on house 450 premises. Electrical load 416 is, for example, a home electrical appliance such as an air-conditioner or a washing machine. An amount of operation, an amount of power consumption, or the like of electrical load 416 may be adjusted, for example, as its operation is controlled in response to a control signal S2 from house ECU 406. House ECU 406 may control switch portion 414, for example, such that switching from the first state to the second state is made during a prescribed period including a part or the whole of a time zone including peak of electric power demand in a supplier of system power supply 402 (such as a power company).

Figure 2:
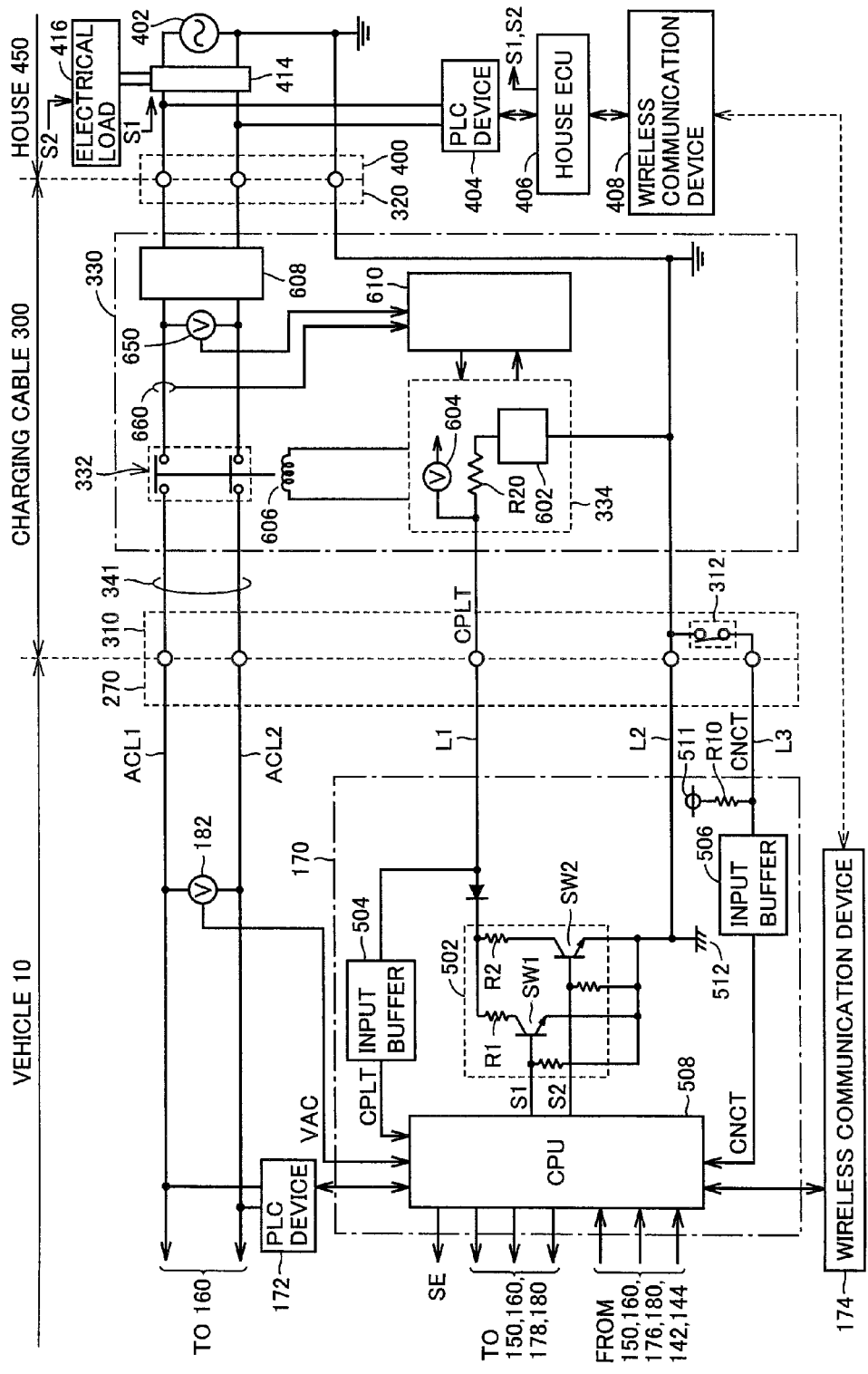
FIG. 2 shows one example of a detailed diagram of the charge and discharge system in FIG. 1.

FIG. 2 is a diagram for more specifically describing a configuration of charge and discharge system 1 shown in FIG. 1. It is noted that description of a redundant element in FIG. 2 having a reference numeral the same as in FIG. 1 will not be repeated.

Referring to FIG. 2, CCID 330 further includes, in addition to CCID relay 332 and control pilot circuit 334, an electromagnetic coil 606, a leakage detector 608, a CCID control unit 610, a voltage sensor 650, and a current sensor 660. Control pilot circuit 334 includes an oscillation device 602, a resistor R20, and a voltage sensor 604.

CCID control unit 610 includes a CPU, a storage device, and an input/output buffer, none of which is shown. CCID control unit 610 receives input of and provides output of a signal from/to each sensor and control pilot circuit 334, and controls an operation of charging cable 300.

Oscillation device 602 outputs a non-oscillating signal when a potential of pilot signal CPLT detected by voltage sensor 604 is at a defined potential (for example, 12 V). Oscillation device 602 outputs a signal oscillating at a defined frequency (for example, 1 kHz) in a defined duty cycle, under the control by CCID control unit 610, when the potential of pilot signal CPLT has lowered (for example, 9 V) from the defined potential above.

It is noted that a potential of pilot signal CPLT is controlled by vehicle ECU 170. In addition, a duty cycle is set based on a rated current which can be supplied from system power supply 402 to vehicle 10 through charging cable 300.

When the potential of pilot signal CPLT lowers from the defined potential as described above, pilot signal CPLT is oscillated in a defined cycle. A pulse width of pilot signal CPLT is set based on a rated current which can be supplied from system power supply 402 to vehicle 10 through charging cable 300. Namely, depending on a duty indicated by a ratio of a pulse width to this oscillation cycle, with the use of pilot signal CPLT, vehicle ECU 170 in vehicle 10 is notified of a rated current from control pilot circuit 334.

It is noted that a rated current is determined for each charging cable and a rated current will be different if a type of charging cable 300 is different. Therefore, a duty of pilot signal CPLT is also different for each charging cable 300.

Vehicle ECU 170 can detect a rated current which can be supplied to vehicle 10 through charging cable 300 based on a duty of pilot signal CPLT received through a control pilot line L1.

When vehicle ECU 170 further lowers the potential of pilot signal CPLT (for example, 6 V), control pilot circuit 334 supplies a current to electromagnetic coil 606. When a current is supplied from control pilot circuit 334, electromagnetic coil 606 generates electromagnetic force to thereby close a contact of CCID relay 332 so that a conducting state is established.

Leakage detector 608 is provided in an intermediate portion of power line 341 of charging cable 300 in CCID 330, and it detects whether leakage occurs or not. Specifically, leakage detector 608 detects a state of equilibrium of currents which flow in directions reverse to each other in paired power lines 341, and when the state of equilibrium is disturbed, leakage detector 608 detects occurrence of leakage. Though not particularly shown, when leakage detector 608 detects leakage, power feed to electromagnetic coil 606 is cut off and the contact of CCID relay 332 is opened so that a non-conducting state is established.

Voltage sensor 650 detects a power supply voltage transferred from system power supply 402 when plug 320 is inserted in socket 400, and transmits the detection value to CCID control unit 610. In addition, current sensor 660 detects a charging current which flows through power line 341 and transmits the detection value to CCID control unit 610.

Connection detection circuit 312 included in connector 310 is, for example, a limit switch as described above, and a contact is closed while connector 310 is connected to inlet 270 and the contact is opened while connector 310 is disconnected from inlet 270.

While connector 310 is disconnected from inlet 270, a voltage signal determined by a pull-up resistor R10 and a voltage at a power supply node 511 included in vehicle ECU 170 is generated on a connection signal line L3 as connection signal CNCT. In addition, while connector 310 is connected to inlet 270, connection signal line L3 is short-circuited to a ground line L2 and therefore a potential of connection signal line L3 is set to a ground potential (0 V).

It is noted that connection detection circuit 312 can also be implemented by a resistor (not shown). In this case, while connector 310 is connected to inlet 270, a voltage signal determined by a voltage at power supply node 511 and pull-up resistor R10 as well as by this resistor is generated on connection signal line L3.

Whether connection detection circuit 312 is implemented by either a limit switch or a resistor as above, a potential generated on connection signal line L3 (that is, a potential of connection signal CNCT) changes between the case where connector 310 is connected to inlet 270 and the case where connector 310 is disconnected from inlet 270. Therefore, by detecting a potential of connection signal line L3, vehicle ECU 170 can detect a state of connection of connector 310.

In vehicle 10, vehicle ECU 170 further includes a resistance circuit 502, input buffers 504, 506, and a CPU 508, in addition to power supply node 511 and pull-up resistor R10 above. Input buffers 504, 506 are included in memory 171 in FIG. 1.

Resistance circuit 502 includes pull-down resistors R1, R2 and switches SW1, SW2. Pull-down resistor R1 and switch SW1 are connected in series between control pilot line L1 through which pilot signal CPLT communicates and a vehicle ground 512. Pull-down resistor R2 and switch SW2 are also connected in series between control pilot line L1 and vehicle ground 512. Then, switches SW1, SW2 are controlled to be conducting or non-conducting in accordance with control signals S1, S2 from CPU 508.

This resistance circuit 502 is a circuit for controlling a potential of pilot signal CPLT from the vehicle 10 side.

Input buffer 504 receives pilot signal CPLT on control pilot line L1 and outputs received pilot signal CPLT to CPU 508. Input buffer 506 receives connection signal CNCT through connection signal line L3 connected to connection detection circuit 312 of connector 310 and outputs received connection signal CNCT to CPU 508. It is noted that vehicle ECU 170 causes a voltage to be applied to connection signal line L3 as described above, and a potential of connection signal CNCT changes as connector 310 is connected to inlet 270. CPU 508 detects a state of connection of connector 310 by detecting a potential of this connection signal CNCT.

CPU 508 receives pilot signal CPLT and connection signal CNCT from input buffers 504, 506, respectively.

CPU 508 detects a potential of connection signal CNCT and detects a state of connection of connector 310.

CPU 508 detects a rated current of charging cable 300 as described above by detecting an oscillation state and a duty cycle of pilot signal CPLT.

CPU 508 controls a potential of pilot signal CPLT by controlling control signals S1, S2 for switches SW1, SW2 based on a potential of connection signal CNCT and a state of oscillation of pilot signal CPLT. Thus, CPU 508 can remotely control CCID relay 332. Then, electric power is supplied from vehicle 10 to house 450 or from house 450 to vehicle 10, through charging cable 300.

Referring to FIGS. 1 and 2, while the contact of CCID relay 332 is closed and switch portion 414 is in the first state, AC power from system power supply 402 is provided to power conversion device 160 and preparation for charging power storage device 150 from system power supply 402 is completed. As CPU 508 outputs control signal PWE to power conversion device 160, CPU 508 causes AC power from system power supply 402 to be converted to DC power with which power storage device 150 can be charged. CPU 508 outputs control signal SE to close the contact of relay 155, so that power storage device 150 is charged.

On the other hand, while the contact of CCID relay 332 is closed and switch portion 414 is in the second state, CPU 508 outputs control signal SE to thereby close the contact of relay 155, and outputs control signal PWE to power conversion device 160. Power conversion device 160 converts DC power from power storage device 150 to AC power based on control signal PWE and causes resultant AC power to be supplied to electrical load 416 through power lines 241, 341, 441.

In charge and discharge system 1 having the configuration as above, house ECU 406 and vehicle ECU 170 cooperate with each other to cause system power supply 402 to charge power storage device 150 or cause power storage device 150 to serve as a power supply for house 450 to thereby supply electric power from power storage device 150 to electrical load 416.

For example, for the purpose to avoid peak of electric power demand in the supplier of system power supply 402, house ECU 406 requests vehicle ECU 170 for discharge during a prescribed time zone and switches switch portion 414 from the first state to the second state. Vehicle ECU 170 causes the contact of CCID relay 332 to close in response to a request for discharge from house ECU 406 to thereby operate power conversion device 160, so that electric power in power storage device 150 is supplied to electrical load 416.

There is a case, however, that a requested amount of electric power requested to vehicle 10 by house 450 exceeds discharging capability of power storage device 150 due to the large number of electrical appliances simultaneously used in electrical load 416 or use of an electrical appliance high in power consumption. In such a case, an amount requested by house 450 may not be met.

Then, the present embodiment is characterized in that MG 120 is controlled such that generated electric power generated in MG 120 as a result of operation of engine 140 in addition to electric power output from power storage device 150 is supplied to the outside of the vehicle when electric power in power storage device 150 is supplied to house 450 outside the vehicle and when a requested amount of electric power requested from the outside of the vehicle exceeds available supply electric power of power storage device 150.

In the present embodiment, when generated electric power is to be generated while engine 140 remains stopped, vehicle ECU 170 causes MG 120 to operate engine 140. Vehicle ECU 170 causes generation of generated electric power by causing engine 140 to operate and thereafter to generate power generation torque in a direction reverse to a direction of engine torque.

When generated electric power is to be generated while engine 140 is operating, vehicle ECU 170 causes generation of generated electric power by maintaining an operating state of engine 140 and causing generation of power generation torque in the direction reverse to the direction of engine torque. Though description is given in the present embodiment assuming that engine 140 is started by MG 120, engine 140 may be started by a not-shown starter motor.

In the present embodiment, when a requested amount of electric power requested by house 450 exceeds available supply electric power of power storage device 150, vehicle ECU 170 determines whether or not to suppress generation of generated electric power based on an amount of emission of $CO_2$ and a position of vehicle 10. In the description below, an operation for supplying generated electric power generated by MG 120 as a result of operation of engine 140 to house 450 is denoted as "discharge assistance".

A control structure of a program executed by house ECU 406 in the present embodiment will be described with reference to FIGS. 3 and 4.

Figure 3:
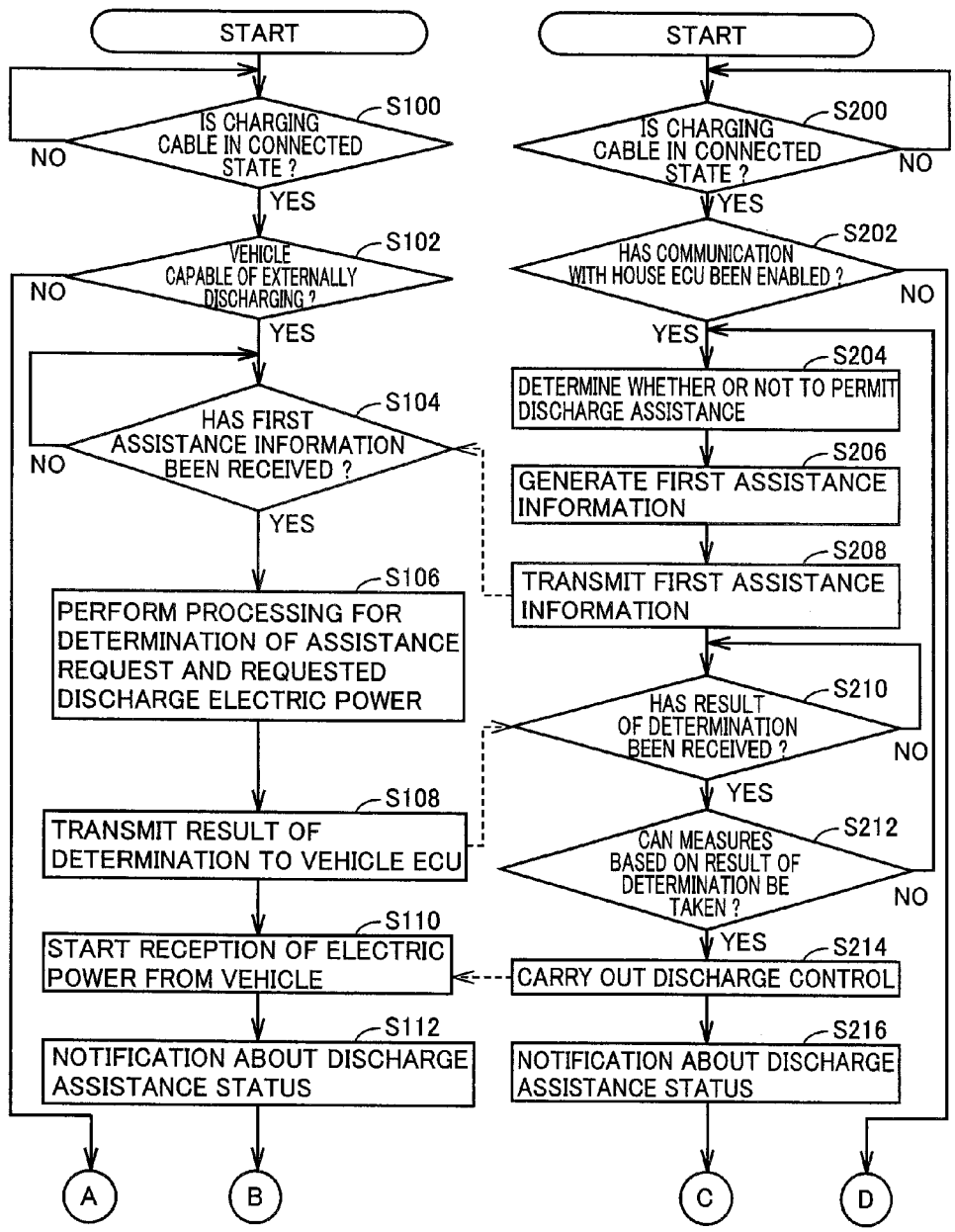
FIG. 3 is a flowchart (No. 1) showing a control structure of a program executed in each of a house ECU and a vehicle ECU.

As shown in FIG. 3, in step (hereinafter a step being denoted as S) 100, house ECU 406 determines whether or not charging cable 300 is in a state connected to each of vehicle 10 and house 450. When plug 320 and socket 400 are connected to each other and connector 310 and inlet 270 are connected to each other, vehicle ECU 170 transmits a signal indicating that charging cable 300 is in a connected state to house ECU 406 through wireless communication or wired communication described above.

When house ECU 406 receives from vehicle ECU 170, a signal indicating that charging cable 300 is in a connected state, it determines that charging cable 300 is in a connected state.

When charging cable 300 is in a connected state (YES in S100), the process proceeds to S102. Otherwise (NO in S100), the process returns to S100.

In S102, house ECU 406 determines whether or not vehicle 10 is a vehicle capable of externally discharging. Vehicle ECU 170 transmits vehicle information for specifying whether or not a vehicle is capable of externally discharging when charging cable 300 is in a connected state, to house ECU 406 through wireless communication or wired communication described above. House ECU 406 determines whether or not vehicle 10 is a vehicle capable of externally discharging based on the vehicle information received from vehicle ECU 170.

When vehicle 10 is a vehicle capable of externally discharging (YES in S102), the process proceeds to S104. Otherwise (NO in S102), this process ends.

In S104, house ECU 406 determines whether or not it has received first assistance information from vehicle ECU 170. The first assistance information includes information on whether or not to permit discharge assistance to be carried out in vehicle 10 (hereinafter denoted as whether or not to permit discharge assistance), an electric power upper limit value Psul_a, Psul_b corresponding to whether or not discharge assistance is carried out, and an amount of emission (hereinafter denoted as an emission factor) Cc_a, Cc_b of $CO_2$ per unit power generation amount (g/kWh) corresponding to whether or not discharge assistance is carried out. Details of a method for generating the first assistance information will be described later. It is noted that the first assistance information is not particularly limited to the information described above so long as information can determine whether or not house ECU 406 requests discharge assistance to vehicle 10.

In S106, house ECU 406 performs determination processing for determining whether or not to request discharge assistance and a requested amount of discharge electric power requested to vehicle 10 (hereinafter denoted as requested discharge electric power) based on the received first assistance information. House ECU 406 determines whether or not to request discharge assistance and requested discharge electric power as the determination processing is performed. Details of the determination processing will be described later.

In S108, house ECU 406 transmits to vehicle ECU 170, a signal indicating a result of determination as to whether or not to request discharge assistance and requested discharge electric power through wireless communication or wired communication described above.

In S110, upon receiving notification that discharge control is to be carried out from vehicle ECU 170, house ECU 406 starts reception of electric power from vehicle 10. In S112, house ECU 406 notifies a user of information on whether or not discharge assistance is being carried out, through notification portion 417.

Figure 4:
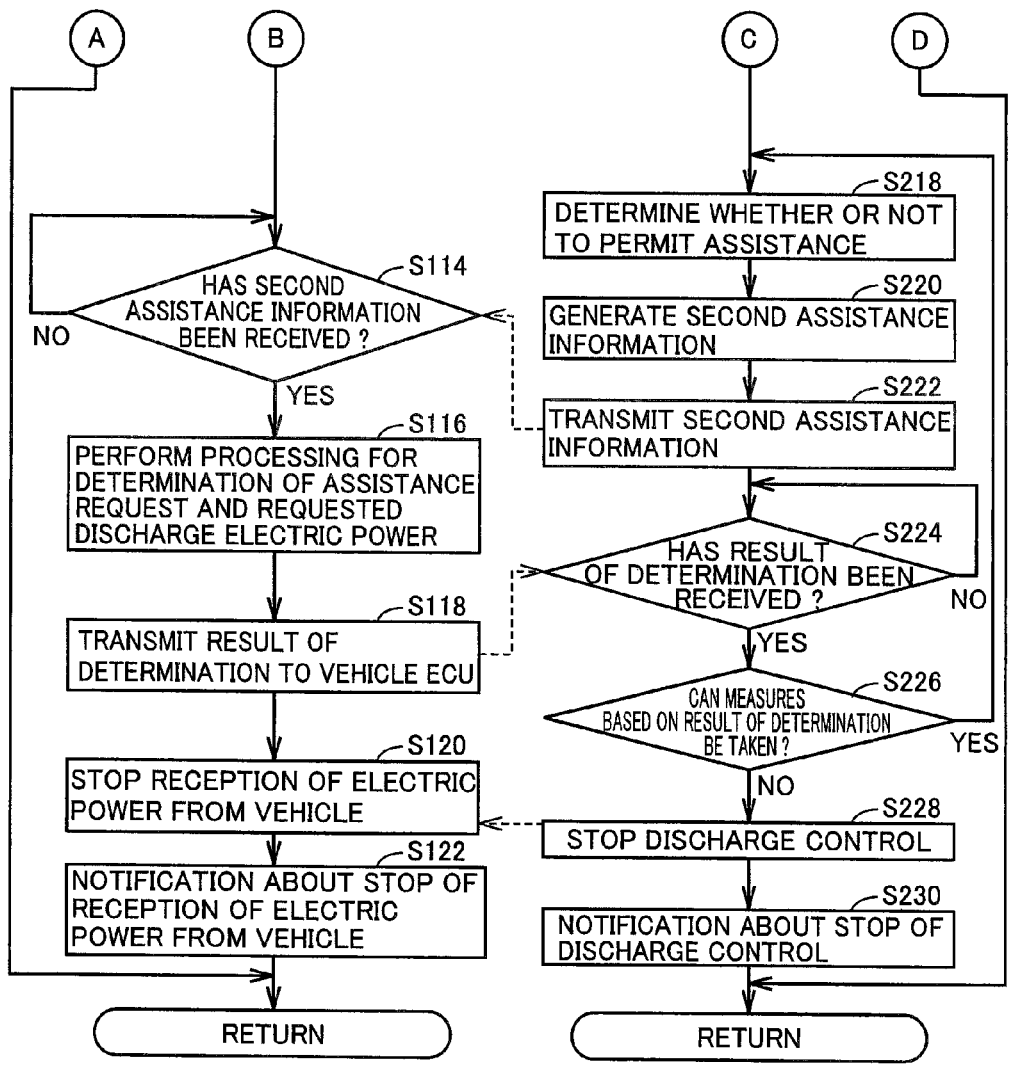
FIG. 4 is a flowchart (No. 2) showing the control structure of the program executed in each of the house ECU and the vehicle ECU.

As shown in FIG. 4, in S114, house ECU 406 determines whether or not it has received second assistance information from vehicle ECU 170.

Similarly to the first assistance information, the second assistance information includes information on whether or not to permit discharge assistance in vehicle 10, an electric power upper limit value $Psul\_c$, $Psul\_d$ corresponding to whether or not discharge assistance is carried out, and an amount of emission (hereinafter denoted as an emission factor) $Cc\_c$, $Cc\_d$ of $CO_2$ per unit power generation amount (g/kWh) corresponding to whether or not discharge assistance is carried out. The first assistance information is information before discharge control is carried out and the second assistance information is information after discharge control was carried out. A method for generating the second assistance information is similar to the method for generating the first assistance information.

When the second assistance information is received from vehicle ECU 170 (YES in S114), the process proceeds to S116. Otherwise (NO in S114), the process returns to S114.

In S116, house ECU 406 performs determination processing for determining whether or not to request discharge assistance and requested discharge electric power based on the received second assistance information. This determination processing is processing the same as the determination processing performed in S106. House ECU 406 determines whether or not to request discharge assistance and requested discharge electric power as the determination processing is performed.

In S118, house ECU 406 transmits to vehicle ECU 170, a signal indicating a result of determination as to whether or not to request discharge assistance and requested discharge electric power through wireless communication or wired communication described above.

In S120, upon receiving notification about end of discharge control from vehicle ECU 170, house ECU 406 ends reception of electric power from vehicle 10. In S122, house ECU 406 notifies a user of information on end of reception of electric power from vehicle 10 through notification portion 417.

A control structure of the program executed by vehicle ECU 170 in the present embodiment will now be described with reference to FIGS. 3 and 4.

As shown in FIG. 3, in S200, vehicle ECU 170 determines whether or not charging cable 300 is in a state connected to each of vehicle 10 and house 450. Vehicle ECU 170 may determine whether or not charging cable 300 is in a state connected to each of vehicle 10 and house 450, for example, based on a voltage of a CPLT signal described above. Alternatively, vehicle ECU 170 may determine whether or not charging cable 300 is in a state connected to each of vehicle 10 and house 450, for example, based on a CNCT signal described above. When charging cable 300 is in a connected state (YES in S200), the process proceeds to S202. Otherwise (NO in S200), the process returns to S200.

In S202, vehicle ECU 170 determines whether or not it is in a state communicable with house ECU 406. For example, when vehicle ECU 170 receives a prescribed signal for starting communication from house ECU 406, it may determine that it is in a state communicable with house ECU 406.

It is noted that, when vehicle ECU 170 in a state communicable with house ECU 406, vehicle ECU 170 may transmit a signal indicating that charging cable 300 is in a connected state and a signal indicating vehicle information for specifying whether or not vehicle 10 is a vehicle capable of externally discharging to house ECU 406 through wireless communication or wired communication described above.

When communication with house ECU 406 is enabled (YES in S202), the process proceeds to S204. Otherwise (NO in S202), the process returns to S200.

In S204, vehicle ECU 170 determines whether or not to permit discharge assistance. For example, when a position of vehicle 10 obtained from navigation system 176 is in a prescribed area, vehicle ECU 170 does not permit discharge assistance to be carried out (that is, prohibits discharge assistance to be carried out). When a position of vehicle 10 is out of a prescribed area, vehicle ECU 170 permits discharge assistance to be carried out.

The prescribed area is a predetermined area specified on a map, where refrainment of operation of engine 140 is required. The prescribed area may be, for example, an area where suppression of emission of $CO_2$ is required such as a nature reserve, an area where stop of engine 140 is required by laws and regulations such as an idling stop law, or a parking area in an indoor garage where exhaust facilities are not provided, and the prescribed area is not particularly limited thereto.

In S206, vehicle ECU 170 generates the first assistance information. As described above, the first assistance information includes information on whether or not to permit discharge assistance in vehicle 10, electric power upper limit value $Psul\_a$, $Psul\_b$ corresponding to whether or not discharge assistance is carried out, and emission factor $Cc\_a$, $Cc\_b$ corresponding to whether or not discharge assistance is carried out.

For example, vehicle ECU 170 calculates upper limit value $Psul\_a$ for electric power which can be supplied from vehicle 10 to house 450 when discharge assistance is carried out and upper limit value $Psul\_b$ for electric power which can be supplied from vehicle 10 to house 450 when discharge assistance is not carried out. Vehicle ECU 170 calculates the sum of an upper limit value Wout for discharge electric power of power storage device 150 and an upper limit value Pgul for generated electric power as electric power upper limit value $Psul\_a$ corresponding to a case where discharge assistance is carried out.

Vehicle ECU 170 calculates upper limit value Wout for discharge electric power of power storage device 150, for example, based on a temperature, SOC, a degree of deterioration, or the like of power storage device 150. Vehicle ECU 170 calculates upper limit value Wout for discharge electric power, for example, based on a prescribed map of a temperature and SOC of power storage device 150. The prescribed map is a map showing predetermined relation between a temperature and SOC of power storage device 150 and upper limit value Wout for discharge electric power.

Vehicle ECU 170 calculates upper limit value Wout for discharge electric power, for example, every prescribed period. The prescribed period may be, for example, from a period of several seconds such as one second or ten seconds to several ten seconds. Alternatively, vehicle ECU 170 may calculate upper limit value Wout for discharge electric power consecutively for each calculation cycle (for example, several milliseconds).

Vehicle ECU 170 calculates upper limit value Pgul for generated electric power, for example, based on cooling water temperature Tw and intake air temperature Ti of engine 140. Vehicle ECU 170 may calculate upper limit value Pgul for generated electric power based on cooling water temperature Tw and intake air temperature Ti of engine 140 and a prescribed map. The prescribed map is a map showing predetermined relation between cooling water temperature Tw, intake air temperature Ti, and upper limit value Pgul for generated electric power.

It is noted that vehicle ECU 170 may calculate upper limit value Pgul for generated electric power based on at least any parameter of cooling water temperature Tw and intake air temperature Ti and a prescribed map, or may calculate upper limit value Pgul for generated electric power based on a prescribed map and another parameter about a state of engine 140 instead of or in addition to the parameter above.

Furthermore, for example, vehicle ECU 170 may calculate rated electric power of MG 120 as upper limit value Pgul for generated electric power, or may calculate a value with rated electric power of MG 120 being defined as a reference (for example, a value lower by a prescribed amount than rated electric power) as upper limit value Pgul for generated electric power, or may calculate the prescribed amount described above based on cooling water temperature Tw or intake air temperature Ti of engine 140.

On the other hand, vehicle ECU 170 calculates upper limit value Wout for discharge electric power of power storage device 150 as electric power upper limit value Psul_b corresponding to a case where discharge assistance is not carried out. It is noted that, when it is not permitted to carry out discharge assistance, vehicle ECU 170 does not have to calculate electric power upper limit value Psul_a corresponding to the case where discharge assistance is carried out.

Vehicle ECU 170 calculates, for example, a value obtained by dividing a $CO_2$ emission factor of an electric power source during charging of power storage device 150 by efficiency as emission factor Cc_b corresponding to the case where discharge assistance is not carried out. The electric power source is, for example, system power supply 402. Efficiency is a value in consideration of loss during charging of and discharging from power storage device 150.

Vehicle ECU 406 calculates a value obtained by adding an emission factor in a case where generated electric power is generated by using engine 140 and MG 120 to this emission factor Cc_b as emission factor Cc_a corresponding to the case where discharge assistance is carried out.

Regarding the $CO_2$ emission factor of the electric power source during charging of power storage device 150, for example, such a $CO_2$ emission factor that a case of power generation in a nuclear power plant is assumed is applied to the case of charging with night time electric power, and such a CO2 emission factor that a case of power generation in a thermal power plant is assumed is applied to the case of charging during day time.

An emission factor in the case of generation of generated electric power by using engine 140 and MG 120 may have, for example, a prescribed value determined by relation with a $CO_2$ emission amount with respect to an amount of power generation obtained through experiments or the like.

In S208, vehicle ECU 170 transmits the first assistance information to house ECU 406. In S210, vehicle ECU 170 determines whether or not it has received from house ECU 406, a result of determination as to whether or not to request discharge assistance and requested discharge electric power. When the result of determination as to whether or not to request discharge assistance and requested discharge electric power is received from house ECU 406 (YES in S210), the process proceeds to S212. Otherwise (NO in S210), the process returns to S210.

In S212, vehicle ECU 170 determines whether or not measures based on the result of determination received from house ECU 406 can be taken. For example, when requested discharge electric power is equal to or lower than electric power upper limit value Pusl corresponding to whether or not to permit discharge assistance, vehicle ECU 170 determines that measures based on the result of determination can be taken. When measures based on the result of determination can be taken (YES in S212), the process proceeds to S214. Otherwise (NO in S212), the process returns to S204.

In S214, vehicle ECU 170 carries out discharge control. In addition, vehicle ECU 170 carries out discharge control and notifies house ECU 406 of the fact that discharge control has been carried out. In S216, vehicle ECU 170 notifies a user of whether or not discharge assistance is carried out through notification portion 178.

As shown in FIG. 4, in S218, vehicle ECU 170 determines whether or not to permit discharge assistance. Since the method of determining permission is as described in connection with 5204 above, detailed description thereof will not be repeated.

In S220, vehicle ECU 170 generates the second assistance information. As described above, the second assistance information is different from the first assistance information in that it is generated after discharge control was carried out, however, it is otherwise the same. Therefore, detailed description of the method of generation will not be repeated.

In S222, vehicle ECU 170 transmits the second assistance information to house ECU 406. In S224, vehicle ECU 170 determines whether or not it has received from house ECU 406, a result of determination as to whether or not to request discharge assistance and requested discharge electric power. When the result of determination as to whether or not to request discharge assistance and requested discharge electric power is received from house ECU 406 (YES in S224), the process proceeds to S226. Otherwise (NO in S224), the process returns to S224.

In S226, vehicle ECU 170 determines whether or not measures based on the result of determination received from house ECU 406 can be taken.

For example, when requested discharge electric power is equal to or lower than electric power upper limit value Pusl corresponding to whether or not to permit discharge assistance, vehicle ECU 170 determines that measures based on the result of determination can be taken.

In addition, for example, vehicle ECU 170 may determine that measures based on the result of determination can be taken when SOC of power storage device 150 is greater than a threshold value and determine that measures based on the result of determination cannot be taken when SOC of power storage device 150 is equal to or lower than the threshold value.

When measures based on the result of determination can be taken (YES in S226), the process returns to S218. Otherwise (NO in S226), the process proceeds to S228. In S228, vehicle ECU 170 ends discharge control. Vehicle ECU 170 ends discharge control and may notify house ECU 406 of end of discharge control. In S230, vehicle ECU 170 notifies a user of end of discharge control through notification portion 178.

Figure 5:
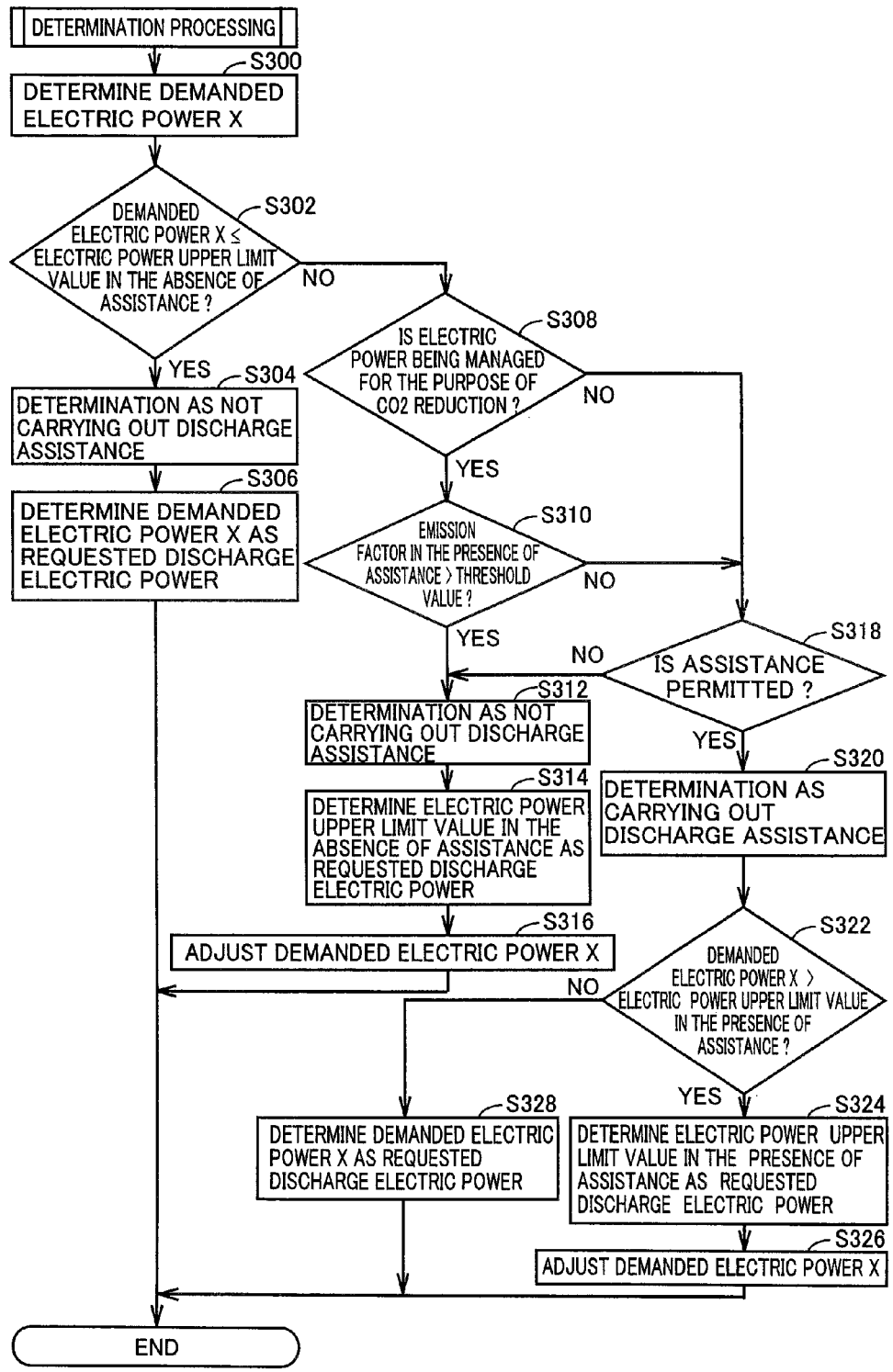
FIG. 5 is a flowchart showing a control structure of a program for processing for determination of requested discharge electric power executed by the house ECU.

A control structure of a program for determination processing performed by house ECU 406 in the present embodiment will now be described with reference to FIG. 5.

In S300, house ECU 406 determines demanded electric power X. It is noted that demanded electric power X is electric power necessary for operating electrical appliances being used in house 450, which is a value converted to DC power. House ECU 406 may determine demanded electric power X, for example, based on the sum of rated electric power of electrical appliances being used in house 450. House ECU 406 may determine demanded electric power X, for example, based on the sum of power consumption by electrical appliances being used in house 450. House ECU 406 may determine demanded electric power X, for example, based on an estimated value of the sum of power consumption from now until lapse of a predetermined time period. House ECU 406 may determine demanded electric power X based on an average value of the sum of amounts of electricity consumed during a period which precedes the current time point by a predetermined time period. House ECU 406 may determine demanded electric power X based on a maximum value of the sum of an amount of electricity consumed during a period which precedes the current time point by a predetermined time period.

It is noted that house ECU 406 may determine as final demanded electric power X, electric power obtained by subtracting generated electric power from power generation facilities from demanded electric power X in the case where it has such power generation facilities as a photovoltaic power system.

In S302, house ECU 406 determines whether or not demanded electric power X is equal to or lower than upper limit value Psul for discharge electric power calculated in vehicle 10, which corresponds to the case where discharge assistance is not carried out. When demanded electric power X is equal to or lower than upper limit value Psul for discharge electric power corresponding to the case where discharge assistance is not carried out (YES in S302), the process proceeds to S304. Otherwise (NO in S302), the process proceeds to S308.

In S304, house ECU 406 determines not to carry out discharge assistance (without discharge assistance). In S306, house ECU 406 determines demanded electric power X as requested discharge electric power.

In S308, house ECU 406 determines whether or not electric power is being managed for the purpose of $CO_2$ reduction.

It is assumed, for example, that power management for the purpose of $CO_2$ reduction can be selected by a user of house 450. During power management for the purpose of $CO_2$ reduction, house ECU 406 decreases an amount of emission of $CO_2$ corresponding to consumed power in currently used electrical appliances by a prescribed ratio or a prescribed amount, or controls the electrical appliances such that an amount of emission of $CO_2$ corresponding to consumed power in currently used electrical appliances is minimized. For example, house ECU 406 sets an electrical appliance which has been started up but has not been used for a prescribed time period to a stand-by mode or shortens the prescribed period. Alternatively, house ECU 406 decreases the number of times of start-up or a period of use of an electrical appliance which is periodically started up, or starts up such an electrical appliance in a time zone when a $CO_2$ emission factor of system power supply 402 is low (for example, during night time). House ECU 406 uses power storage device 150 in vehicle 10 as a power source during a time zone when a $CO_2$ emission factor of system power supply 402 is high (for example, day time). House ECU 406 brings a current value of a target temperature in a room closer to a room temperature by a prescribed amount when an electrical appliance is such an air-conditioning facility as an air-conditioner. House ECU 406 controls an electrical appliance so as to lower illuminance in the case where the electrical appliance is a lighting facility. House ECU 406 supplies electric power generated in a photovoltaic power system to an electrical appliance in house 450 when house 450 has the photovoltaic power system. Owing to such an operation of house ECU 406, an amount of $CO_2$ emission from house 450 as a whole is reduced.

When electric power is being managed for the purpose of $CO_2$ reduction (YES in S308), the process proceeds to S310. Otherwise (NO in S308), the process proceeds to S318.

In S310, house ECU 406 determines whether or not an emission factor corresponding to the case where discharge assistance is carried out exceeds a threshold value. The threshold value may be a prescribed value. The threshold value is not particularly limited, for example, so long as it is a value greater than an emission factor corresponding to the case where discharge assistance is not carried out. When the emission factor in the case where discharge assistance is carried out exceeds the threshold value (YES in S310), the process proceeds to S312. Otherwise (NO in S310), the process proceeds to S318.

In S312, house ECU 406 determines not to carry out discharge assistance. In 5314, house ECU 406 determines electric power upper limit value Psul corresponding to the case where discharge assistance is not carried out as requested discharge electric power.

In S316, house ECU 406 adjusts demanded electric power X such that it decreases to determined requested discharge electric power. House ECU 406 may decrease demanded electric power X to requested discharge electric power, for example, by controlling an electrical appliance in house 450 so as to lower power consumption as described above. Alternatively, house ECU 406 may decrease demanded electric power X to requested discharge electric power by stopping supply of electric power to an electrical appliance low in priority.

In S318, house ECU 406 determines whether or not it has been permitted to carry out discharge assistance in vehicle 10. House ECU 406 determines whether or not it has been permitted to carry out discharge assistance in vehicle 10 based on the first assistance information or the second assistance information. When it has been permitted to carry out discharge assistance (YES in S318), the process proceeds to S320. Otherwise (NO in S318), the process proceeds to S312.

In S320, house ECU 406 determines to carry out discharge assistance (with discharge assistance). In S322, house ECU 406 determines whether or not demanded electric power X is greater than electric power upper limit value Psul corresponding to the case where discharge assistance is carried out. When demanded electric power X is greater than electric power upper limit value Psul corresponding to the case where discharge assistance is carried out (YES in S322), the process proceeds to S324. Otherwise (NO in S322), the process proceeds to S328.

In S324, house ECU 406 determines electric power upper limit value Psul corresponding to the case where discharge assistance is carried out as requested discharge electric power. In S326, demanded electric power X is adjusted to decrease to determined requested discharge electric power.

Since a method of adjustment is as described in connection with S316, detailed description thereof will not be repeated.

An operation of vehicle ECU 170 and house ECU 406 in the present embodiment based on the structure and the flowchart as above will be described.

<Case Where Position of Vehicle 10 is in Engine Operation Refrainment Area>

For example, it is assumed that vehicle 10 and house 450 are connected to each other through charging cable 300 (YES in S100, YES in 5200) and vehicle 10 is a vehicle capable of externally discharging (YES in S102). When communication between vehicle ECU 170 and house ECU 406 is enabled (YES in S202), vehicle ECU 170 determines whether or not to permit discharge assistance to be carried out (S204).

When a position of vehicle 10 obtained from navigation system 176 is in an engine operation refrainment area, vehicle ECU 170 does not permit discharge assistance to be carried out (204).

Vehicle ECU 170 generates the first assistance information including information on whether or not to permit discharge assistance to be carried out, electric power upper limit value Psul_a, Psul_b corresponding to whether or not to carry out discharge assistance, and emission factor Cc_a, Cc_b (S206). Vehicle ECU 170 transmits the generated first assistance information to house ECU 406 (S208) and stands by until it receives from house ECU 406, a result of determination as to whether or not to request discharge assistance and requested discharge electric power (NO in S210).

When house ECU 406 receives the first assistance information from vehicle ECU 170 (YES in S104), house ECU 406 performs processing for determination as to whether or not to request discharge assistance and requested discharge electric power (S106).

House ECU 406 determines demanded electric power X in house 450 (S300). When demanded electric power X is, for example, equal to or lower than the electric power upper limit value corresponding to the case where discharge assistance is not carried out (YES in S302), it determines not to carry out discharge assistance (S304) and determines demanded electric power X as requested discharge electric power (S306).

When demanded electric power X is greater than the electric power upper limit value corresponding to the case where discharge assistance is not carried out (NO in S302), it is not permitted to carry out discharge assistance (NO in S318) and therefore it is determined not to carry out discharge assistance (S312). The electric power upper limit value corresponding to the case where discharge assistance is not carried out is determined as requested discharge electric power (S314). House ECU 406 adjusts demanded electric power X (S316).

When it is determined not to carry out discharge assistance and requested discharge electric power is determined, the result of determination is transmitted to vehicle ECU 170 (S108).

When vehicle ECU 170 receives the result of determination (YES in S210) and measures based on the result of determination can be taken (YES in S212), discharge control is carried out (S214).

As discharge control in vehicle 10 is carried out, reception of electric power from power storage device 150 in house 450 is started (S110) and both of notification portion 178 of vehicle 10 and notification portion 412 of house 450 give notification about whether or not discharge assistance is carried out (S112, S216).

After discharge control is carried out, vehicle ECU 170 determines whether or not to permit discharge assistance to be carried out (S218). Similarly to the case of generation of the first assistance information, vehicle ECU 170 generates the second assistance information (S220).

Vehicle ECU 170 transmits the generated second assistance information to house ECU 406 (S222). Vehicle ECU 170 stands by until it receives from house ECU 406, a result of determination as to whether or not to request discharge assistance and requested discharge electric power (NO in S224).

When house ECU 406 receives the second assistance information from vehicle ECU 170 (YES in S114), it performs processing for determination as to whether or not to request discharge assistance and requested discharge electric power (S116). When the first assistance information and the second assistance information are substantially the same, whether or not to request discharge assistance and requested discharge electric power are determined as described above. Therefore, detailed description thereof will not be repeated.

House ECU 406 transmits the result of determination as to whether or not to request discharge assistance and requested discharge electric power to vehicle ECU 170 (S118). When vehicle ECU 170 receives the result of determination (YES in S224), whether or not measures based on the result of determination can be taken is determined (S226).

For example, when SOC of power storage device 150 is equal to or lower than the threshold value, it is determined that measures based on the result of determination cannot be taken (NO in S226). In this case, vehicle ECU 170 stops discharge control (S228) and gives notification about stop of discharge control (S230). As discharge control in vehicle 10 is stopped, reception of electric power from power storage device 150 in house 450 is stopped (S120) and notification about stop of reception of electric power is given (S122).

Thus, when a position of vehicle 10 is within the engine operation refrainment area, engine 140 is stopped and therefore increase in amount of emission of carbon dioxide resulting from operation of engine 140 is suppressed.

In addition, when demanded electric power X is greater than the electric power upper limit value corresponding to the case where discharge assistance is not carried out, requested discharge electric power can be suppressed to the electric power upper limit value or lower by adjusting demanded electric power X. Consequently, vehicle 10 can efficiently be made use of as a power supply for electrical load 416 in house 450.

<Case Where Electric Power Exceeding Discharging Capability of Power Storage Device 150 is Requested>

For example, it is assumed that vehicle 10 and house 450 are connected to each other through charging cable 300 (YES in S100, YES in 5200) and vehicle 10 is a vehicle capable of externally discharging (YES in S102). When communication between vehicle ECU 170 and house ECU 406 is enabled (YES in S202), vehicle ECU 170 determines whether or not to permit discharge assistance to be carried out (S204).

Vehicle ECU 170 permits discharge assistance to be carried out when the position of vehicle 10 obtained from navigation system 176 is out of the engine operation refrainment area.

Vehicle ECU 170 generates the first assistance information including whether or not to permit discharge assistance to be carried out, and electric power upper limit value Psul_a, Psul_b corresponding to whether or not discharge assistance is carried out and emission factor Cc_a, Cc_b (S206). Vehicle ECU 170 transmits the generated first assistance information to house ECU 406 (S208) and stands by until it receives from house ECU 406, a result of determination as to whether or not to request discharge assistance and requested discharge electric power (NO in S210).

When house ECU 406 receives the first assistance information from vehicle ECU 170 (YES in S104), it performs processing for determination as to whether or not to request discharge assistance and requested discharge electric power (S106).

House ECU 406 determines demanded electric power X in house 450 (S300). For example, when demanded electric power X is greater than the electric power upper limit value corresponding to the case where discharge assistance is not carried out (NO in S302), whether or not electric power is being managed for the purpose of $CO_2$ reduction is determined (S308). When electric power is not being managed for the purpose of $CO_2$ reduction (NO in S308), it is permitted to carry out discharge assistance (YES in 5318) and therefore it is determined to carry out discharge assistance (S320). When demanded electric power X is equal to or lower than the electric power upper limit value corresponding to the case where discharge assistance is carried out (NO in S322), demanded electric power X is determined as requested discharge electric power (S328).

When demanded electric power X is greater than the electric power upper limit value corresponding to the case where discharge assistance is carried out (YES in S322), the electric power upper limit value corresponding to the case where discharge assistance is carried out is determined as requested discharge electric power (S324). House ECU 406 adjusts demanded electric power X (S326).

When it is determined to carry out discharge assistance and requested discharge electric power is determined, the result of determination is transmitted to vehicle ECU 170 (S108).

When vehicle ECU 170 receives the result of determination (YES in S210) and measures based on the result of determination can be taken (YES in S212), discharge control is carried out (S214).

As discharge control in vehicle 10 is carried out, reception of electric power from power storage device 150 in house 450 is started (S110) and both of notification portion 178 in vehicle 10 and notification portion 412 in house 450 give notification about whether or not discharge assistance is carried out (S112, S216).

An operation after discharge control was carried out is the same as the operation after discharge control was carried out in the case where the position of vehicle 10 is within the engine operation refrainment area described above except that discharge assistance is carried out. Therefore, detailed description thereof will not be repeated.

Thus, when electric power exceeding discharging capability of power storage device 150 is requested, in addition to electric power in power storage device 150, generated electric power generated in MG 120 by starting engine 140 can be supplied to house 450. Consequently, an electric power request from house 450 can be met.

<Case Where Electric Power for the Purpose of $CO_2$ Reduction is Being Managed and Electric Power Exceeding Discharging Capability of Power Storage Device 150 is Requested>

An operation of vehicle ECU 170 and house ECU 406 until processing for determining whether or not to request discharge assistance and requested discharge electric power is the same as an operation of vehicle ECU 170 and house ECU 406 until the determination processing in the above-described case where electric power exceeding discharging capability of power storage device 150 is requested. Therefore, detailed description thereof will not be repeated.

For example, when demanded electric power X is greater than the electric power upper limit value in the absence of discharge assistance (NO in S302), house ECU 406 determines whether or not electric power is being managed for the purpose of $CO_2$ reduction (S308).

When electric power is being managed for the purpose of $CO_2$ reduction (YES in S308) and when an emission factor corresponding to the case where discharge assistance is carried out is greater than the threshold value (YES in S310), it is determined not to carry out discharge assistance (S312). In this case, the electric power upper limit value corresponding to the case where discharge assistance is not carried out is determined as requested discharge electric power (S314). House ECU 406 adjusts demanded electric power X (S316).

On the other hand, in spite of the fact that electric power is being managed for the purpose of $CO_2$ reduction (YES in S308), when an emission factor corresponding to the case where discharge assistance is carried out is equal to or lower than the threshold value (NO in S310), discharge assistance is permitted (YES in S318) and therefore it is determined to carry out discharge assistance (S320). When demanded electric power X is equal to or lower than the electric power upper limit value corresponding to the case where discharge assistance is carried out (NO in S322), demanded electric power X is determined as requested discharge electric power (S328).

When demanded electric power X is greater than the electric power upper limit value corresponding to the case where discharge assistance is carried out (YES in S322), the electric power upper limit value corresponding to the case where discharge assistance is carried out is determined as requested discharge electric power (S324). House ECU 406 adjusts demanded electric power X (S326).

An operation of vehicle ECU 170 and house ECU 406 after it is determined not to carry out discharge assistance and requested discharge electric power is determined is the same as the operation of vehicle ECU 170 and house ECU 406 in the above-described case where the position of vehicle 10 is within the engine operation refrainment area. Therefore, detailed description thereof will not be repeated.

In addition, an operation of vehicle ECU 170 and house ECU 406 after it is determined to practice discharge assistance and requested discharge electric power is determined is the same as the operation of vehicle ECU 170 and house ECU 406 in the above-described case where electric power exceeding discharging capability of power storage device 150 is requested. Therefore, detailed description thereof will not be repeated.

Thus, while electric power is being managed for the purpose of $CO_2$ reduction, whether or not to carry out discharge assistance can be determined in accordance with an emission factor. Therefore, for example, when an emission factor is equal to or lower than a threshold value, an electric power request from house 450 can be met by carrying out discharge assistance. When an emission factor is greater than the threshold value, vehicle 10 can effectively be made use of as a power supply by adjusting demanded electric power X while increase in $CO_2$ emission amount can be suppressed by not carrying out discharge assistance.

As above, according to vehicle 10 in the present embodiment, when requested electric power requested to vehicle 10 by house 450 exceeds available supply electric power of power storage device 150, in addition to electric power output from power storage device 150, generated electric power generated in MG 120 as a result of operation of engine 140 is supplied to the outside of the vehicle, so that electric power supplied to house 450 outside the vehicle can be brought closer to the requested amount. Therefore, a vehicle, a control method for vehicle, and power reception facilities for meeting an electric power request exceeding discharging capability of a car-mounted battery issued from the outside of the vehicle can be provided.

In addition, when a position of vehicle 10 is within the engine operation refrainment area, engine 140 is stopped and hence emission of an exhaust gas containing carbon dioxide or the like resulting from operation of engine 140 can be suppressed. Moreover, when demanded electric power X is greater than the electric power upper limit value corresponding to the case where discharge assistance is not carried out, requested discharge electric power can be suppressed to the electric power upper limit value or lower by adjusting demanded electric power X. Therefore, vehicle 10 can effectively be made use of as a power supply for electrical load 416 in house 450.

Furthermore, notification about whether or not discharge assistance is carried out can have a user recognize whether or not discharge assistance is being carried out.

In addition, while electric power is being managed for the purpose of $CO_2$ reduction, increase in $CO_2$ emission amount can be suppressed by determining whether or not discharge assistance is to be carried out in accordance with an emission factor.

Though description has been given in the present embodiment assuming that vehicle ECU 170 determines whether or not to permit discharge assistance to be carried out based on a position of vehicle 10, house ECU 406 may make such determination. In addition, though description has been given assuming that house ECU 170 determines whether or not to carry out discharge assistance in accordance with an emission factor during electric power management for the purpose of $CO_2$ reduction, vehicle ECU 170 may make such determination. Furthermore, the electric power upper limit value corresponding to whether or not discharge assistance is carried out may also be calculated by house ECU 406 instead of vehicle ECU 170. Whether or not to request discharge assistance may be determined by vehicle ECU 170 instead of house ECU 406.

Though description has been given in the present embodiment assuming that an electric power source for supply to electrical load 416 is switched from any one of vehicle 10 and system power supply 402 to the other by switch portion 414, both of power storage device 150 and system power supply 402 may serve as electric power sources.

Though it is assumed in the present embodiment that demanded electric power X is adjusted when demanded electric power X is greater than the electric power upper limit value, for example, when demanded electric power X is greater than the electric power upper limit value, a request for electric power supply from vehicle 10 may be withdrawn, or when demanded electric power X is greater than the electric power upper limit value and when it is expected that demanded electric power X does not become lower than the electric power upper limit value in spite of adjustment of demanded electric power X, a request for electric power supply from vehicle 10 may be withdrawn.

Though house 450 has been described by way of example as power reception facilities in the present embodiment, power reception facilities are not particularly limited to house 450 and a building other than a house (commercial facilities or buildings in an industrial establishment) may be applicable.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 charge and discharge system; 10 vehicle; 20 drive portion; 120 MG; 130 drive wheel; 140 engine; 142 intake air temperature sensor; 144 water temperature sensor; 145 power split device; 150 power storage device; 155, 332 relay; 160 power conversion device; 170 vehicle ECU; 171, 407 memory; 172, 404 PLC device; 174, 408 wireless communication device; 176 navigation system; 178 notification portion; 180 motor drive device; 182, 604, 650 voltage sensor; 241, 341, 441, ACL1, ACL2 power line; 270 inlet; 300 charging cable; 310 connector; 312 connection detection circuit; 320 plug; 334 control pilot circuit; 340, 340A, 340B electric wire portion; 400 socket; 402 system power supply; 414 switch portion; 416 electrical load; 450 house; 502 resistance circuit; 504, 504, 506, 506 input buffer; 511 power supply node; 512 vehicle ground; 602 oscillation device; 606 electromagnetic coil; 608 leakage detector; 610 control unit; and 660 current sensor.

The invention claimed is:

1. A vehicle, comprising:
   a power storage device;
   an engine;
   a power generator for charging said power storage device with motive power from said engine; and
   a control device for controlling said power generator to supply to outside of said vehicle, in addition to electric power output from said power storage device, electric power generated by said power generator as a result of operation of said engine when electric power in said power storage device is supplied to the outside of the vehicle and when a requested amount of electric power requested from the outside of said vehicle exceeds available supply electric power of said power storage device.

2. The vehicle according to claim 1, wherein
   when said requested amount exceeds said available supply electric power of said power storage device, said control device determines whether to suppress generation of said generated electric power based on at least any of an amount of emission of carbon dioxide and a position of said vehicle.

3. The vehicle according to claim 2, wherein
   said control device suppresses generation of said generated electric power when said requested amount exceeds said available supply electric power of said power storage device and when the position of said vehicle is in a prescribed area.

4. The vehicle according to claim 3, wherein
   said prescribed area is an area where refrainment of operation of said engine is required.

5. The vehicle according to claim 2, wherein
   said control device suppresses generation of said generated electric power when said requested amount exceeds said available supply electric power of said power storage device and when said amount of emission of said carbon dioxide relative to an amount of generated electric power in generation of said generated electric power is greater than a threshold value.

6. The vehicle according to claim 1, further comprising a notification unit for notifying a user of whether said generated electric power is generated.

7. A control method for vehicle used for a vehicle including a power storage device, an engine, and a power generator for charging said power storage device with motive power from said engine, comprising the steps of:
   determining, when electric power in said power storage device is supplied to the outside of the vehicle, whether a requested amount of electric power requested from outside of said vehicle exceeds available supply electric power of said power storage device; and
   supplying, when a requested amount of electric power requested from the outside of said vehicle exceeds available supply electric power of said power storage device, to the outside of said vehicle, in addition to electric power output from said power storage device, electric power generated by said power generator as a result of operation of said engine.

8. A power reception device for receiving electric power from a vehicle including a power storage device, an engine, and a power generator for charging said power storage device with motive power from said engine, comprising:

an electrical device operating upon receiving supply of electric power from a power supply; and a control device for requesting to said vehicle, generation of electric power in said power generator as a result of operation of said engine when said vehicle is requested to set said power storage device as a supply source of electric power for said electrical device instead of or in addition to said power supply and when a requested amount of electric power requested to said vehicle exceeds available supply electric power of said power storage device.

* * * * *